United States Patent
Bobard et al.

[15] 3,693,987
[45] Sept. 26, 1972

[54] STABILIZERS ENSURING A VERTICAL POSITION TO TWO-WHEELED VEHICLES

[72] Inventors: Emile Bobard, P.O. Box 17, Rue de Reon, Beaune, Cote d'Or; Just Delaunay, L'Etang-Vergy, Cote d'Or, both of France

[22] Filed: May 24, 1971
[21] Appl. No.: 146,077

[52] U.S. Cl. ................. 280/6 H, 280/124 F, 280/63
[51] Int. Cl. ............................................. B60q 17/00
[58] Field of Search ........ 280/63, 64, 65, 150 C, 6 H, 280/6.1, 124 F

[56] References Cited

UNITED STATES PATENTS 3,175,837  5/1972  Bobard ..................... 280/6.1

Primary Examiner—Philip Goodman
Attorney—Roger Goudreau

[57] ABSTRACT

Stabilizing device for a two-wheeled vehicle, the device including two stabilizing wheels mounted, on either side of the bearing line of the wheels of the frame on the ground, on hydraulic supports which are connected to a jack for hydraulic adjustment of their length.

A system of valves permits adjustment of the length of one of said stabilizing wheel supports independently of the length of the other support and of the action of the jack.

6 Claims, 7 Drawing Figures

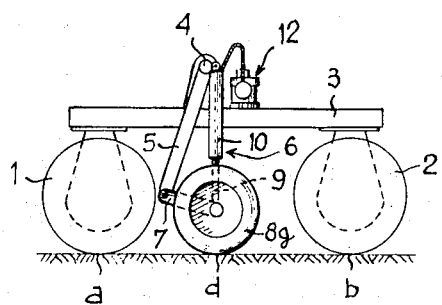
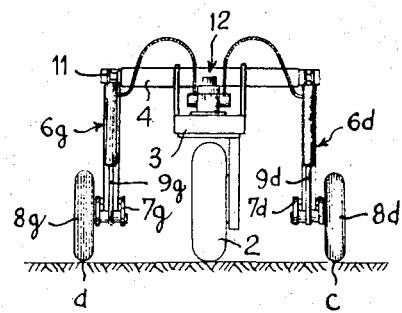
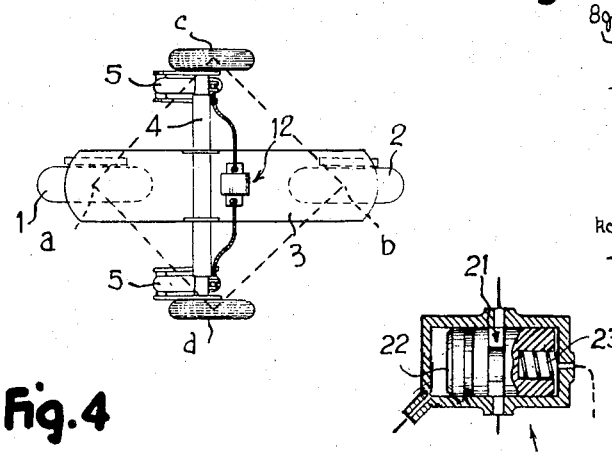
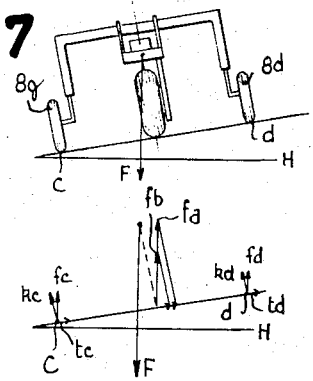
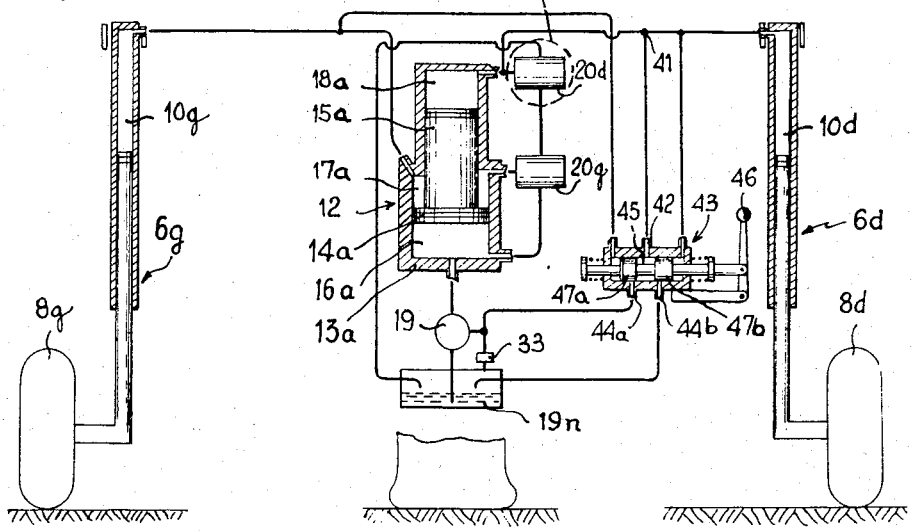

STABILIZERS ENSURING A VERTICAL POSITION TO TWO-WHEELED VEHICLES

The invention concerns a two-wheeled vehicle equipped with a stabilizing device capable of being controlled, at will, to ensure to the vehicle a position which may be vertical, perpendicular to the ground or intermediate between these two limit positions, whatever may be the slope of the ground over which this vehicle may travel.

Already known are vehicles having two wheels bearing a frame and equipped with a two-wheeled device arranged on either side of the bearing line of the wheels of the frame on the ground to ensure the stability of this frame in a direction perpendicular to the said bearing line.

Such devices comprise means for connecting stabilizing wheels to the frame, these means being associated to a jack connected to a circuit of fluid under pressure in order to control, under the effect of the variations of the load applied to the stabilizing wheels, displacements in height of the latter wheels with a view to maintaining the vehicle perpendicular to the ground, whatever may be the slope of this ground.

The stabilization devices of the above type are often equipped, in addition, with means symmetrically ensuring displacements which are equal in height and in opposite directions of the stabilizing wheels in order to keep the vehicle on a practically vertical plane, whatever the slope of the ground over which the vehicle travels.

The invention has for its object a vehicle having a frame carried by two wheels and equipped with a device of two stabilizing wheels, arranged on either side of the bearing line of the wheels of the frame on the ground. Such a stabilizing device comprises means of a hydraulic nature for connecting the stabilizing wheels to the frame, and ensures a position of the vehicle which is perpendicular to the ground. A basic object of the invention is to put forward means applicable to a stabilization device of the above type, permitting, at will, whatever may be the slope of of the ground, a position of the vehicle which may be perpendicular to the ground, vertical or intermediate between these two limit positions.

Another object of the invention is to propose simple means which may be easily combined with the hydraulic means of a stabilization device of a known type in order to ensure at will, whatever may be the slope of the ground, a vertical position of the vehicle, or a position comprised between the vertical position and the position perpendicular to the ground.

Another object of the invention is to propose simple means, intended to equip the hydraulic means of a stabilization device of a known type, to ensure automatically a vertical position of the vehicle, whatever may be the slope of the ground.

A further object of the invention is to put forward fluid distribution means applicable to a system of hydraulic chambers subjected to the action of a jack of a stabilization device with a view to fluid transfers causing displacements in height of one of the stabilizing wheels, these displacements ensuring, on sloping ground, vehicle positions included between a position perpendicular to the ground and a vertical position.

Other objects of the invention will become apparent in the following description with respect to the accompanying drawings, which text and drawings are given only by way of non-limitative example.

In the drawings,

FIGS. 1, 2 and 3 represent respectively side, transverse and plan views of a stabilizer of the invention;

FIG. 4 shows schematically, in section, the hydraulic circuits of the device of the invention;

FIG. 7 is a schema relating to balance of a vehicle equipped with a device of the invention.

Figure 5:
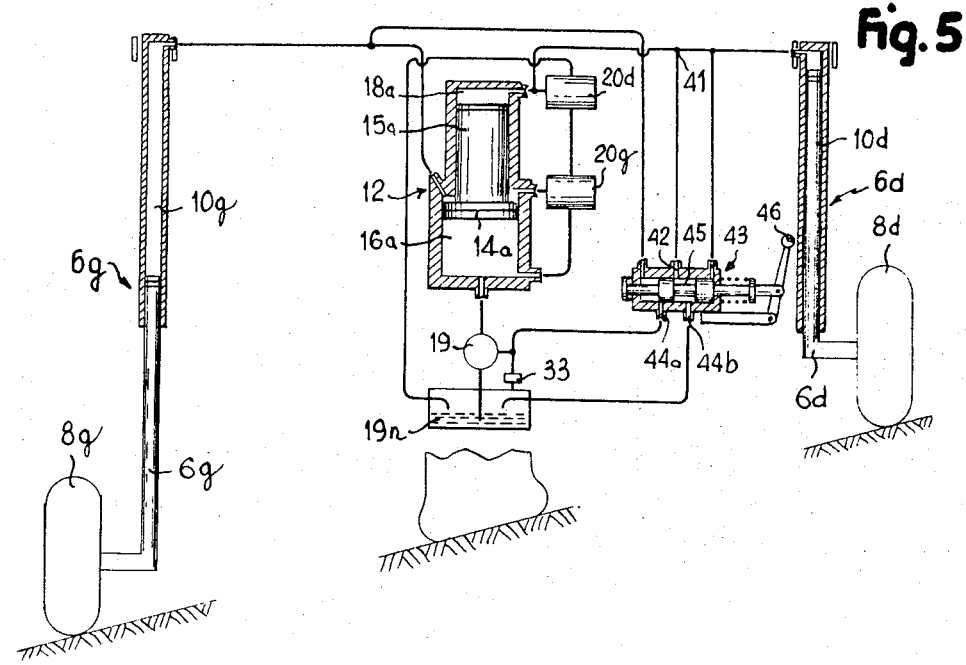
FIGS. 5 and 6 show two special positions of the device of FIG. 4, to clarify the results obtained by the device.

In FIGS. 1 to 3, there is visible the silhouette of a tractor with two drive steering wheels 1, 2 mounted in alignment below a raised frame 3. These wheels constitute a support base $a, b$ which is too narrow to ensure the balance of this tractor at ordinary speeds of travel. Frame 3 consequently has a fixed crossbar 4 with plunger arms $5d$ and $5g$, at each end, which allow the mounting on either side of the tractor of mechanisms with rods $6d$, $6g$ and cranks $7d$, $7g$ which comprise mechanisms for association of two wheels $8d$, $8g$ to frame 3, 5, the said wheels being applied to the ground as will be explained below, thus to form with wheels 1, 2 a quadrilateral of support, $a, c, b, d$.

Each rod 6 comprises a piston rod 9 articulated on crank 7 and slidable in a cylinder 10 whose base is articulated in a bearing member 11 on crossbar 4, so that rod 6 constitutes a prop of adjustable length for its wheel 8.

Props 6 can be controlled by a hydraulic device 12 which comprises substantially (FIG. 4) a system of three jacks $16a$, $17a$, $18a$. This system of jacks $16a$ to $18a$ includes a cylinder $13a$ with two coaxial recesses for two pistons $14a$, $15a$ which are rigidly connected, so that in their respective recesses there are a jack $16a$, an annular jack $17a$ and a jack $18a$ with jacks $16a$ opposed to the action of jacks $17a$ and $18a$.

Thus, it can be seen that jack $16a$ is able to counterbalance at least one of the expansions of two other jacks $17a$ and $18a$.

In addition, jack $16a$ presents a conduit which takes off from the drive circuit of a pump 19, upstream of two identical valves $20d$, $20g$ disposed in series in said circuit.

Each valve presents a slide with annular flow constriction element 21 and a piston 22 which is urged toward a position of closure by a spring 23. Said valve can be opened by the action of the fluid from jack $17a$ (or $18a$) and cylinder 10, to which said valve is connected.

The operation of this device is described in copending application Ser. No. 819,199 filed Apr. 25, 1969 now U.S. Pat. No. 3,610,646 and is repeated below for clearer understanding of the device of the invention.

The pump 19 permanently sucks the fluid from tank $19n$ and passes this fluid toward valves $20d$, $20g$. This fluid passes through the constriction elements 21 of these valves without causing an action capable of modifying the position of their slides, then returns to the tank $19n$, establishing a circuit whereof tank $19n$ constitutes a part that is subject to atmospheric pressure.

The slide of each valve 20 is thus subjected only to two thrusts of opposed direction: the thrust of the spring 23 and the thrust of the fluid on the piston 22. These thrusts (to which reference will again be made hereinbelow) have the effect of moving the constriction element 21 inside the cylinder in order to regulate the flow section of the circuit of pump 19.

The regulation of the flow section of this circuit ensures, by throttling of the stream, regulation of the pressure of the fluid of the part of the circuit situated upstream of valves 20d, 20g and, in particular, the pressure of the fluid of the jack 16a.

The force applied by this pressure of the fluid on the piston 14a of jack 16a counterbalances the forces applied on pistons 15a, 14a' by the pressures of the fluids of the jacks 17a, 18a.

The chambers of these two jacks 17a, 18a are connected to the respective cylinders 10g, 10d to apply on wheels 8, by means of props 6, forces ensuring the stability of the vehicle in the crosswise direction "c,d".

The load F of the tractor is in fact balanced (on a horizontal or inclined terrain) by the reactions fa, fb of wheels 1 and 2 and by one at least of the two reactions fc, fd of wheels 8d, 8g of the device (FIG. 7).

To these reactions fc, fd correspond thrusts kc, kd of the respective props 6d, 6g on the wheels 8 and these thrusts kc, kd determine, in the closed volume systems 17a–10 and 18a–10d, pressures which are transmitted to the chambers with pistons 22 of the respective valves 20d, 20g.

In this way, the thrust applied by the fluid on a piston 22 (which thrust is a function of the section of this piston and of said pressure) counterbalances the thrust of the spring 23 (which is a function of the crushing of said spring) in order to ensure to its construction element 21 a position of balance which is consequently a function of the corresponding load kc (or kd).

In the case of a crosswise inclined position of the tractor on flat terrain, thrusts kc, kd and consequently the pressures of the hydraulic systems (such as 17a–10g) are different from each other; the valve 20 connected to the hydraulic system of the wheel 8 bearing the smaller load (for example wheel 8d in the case of FIG. 7) is in a more closed position than the other valve, so that the element 21 of this valve takes up a position which ensures to the jack 16a a pressure sufficient for the force of the piston 14 to be equal to the arithmetical sum of the forces of the pistons 14a', 15a which correspond to thrusts kc, kd of wheels 8d and 8g.

Since the closed volume systems 17a–10g, 18a–10d are identical to each other, the action of the jack 16a, in the direction of its expansion, obviously causes equal elongation of props 6d, 6g so that, in all cases, the median plane of the tractor has a normal position along the bearing line of wheels 8d, 8g.

Obviously, the power of the pump 19 is appropriate for the maximum pressure to be developed in jack 16 and the crush-resistance of the closing spring is appropriate for a gradual valve-opening action.

As a result, taking into account the loads which may be applied to wheels 8 and the corresponding forces of jacks 16a, 17a and 18a, there are chosen, preferably for the particularities of a valve 20, values which ensure, in the case of a tractor on horizontal ground, thrusts on wheels 8 sufficiently great to maintain the tractor in a perpendicular position which corresponds substantially to its position of unstable balance but low enough not to modify appreciably the loads applied to wheels 1 and 2 for good sticking of said wheels on the ground.

It is possible to obtain righting effects for the vehicle by using a remarkably simple device which allows transfer of fluid from the rod cylinders to jacks associated with said cylinders.

Figure 6:
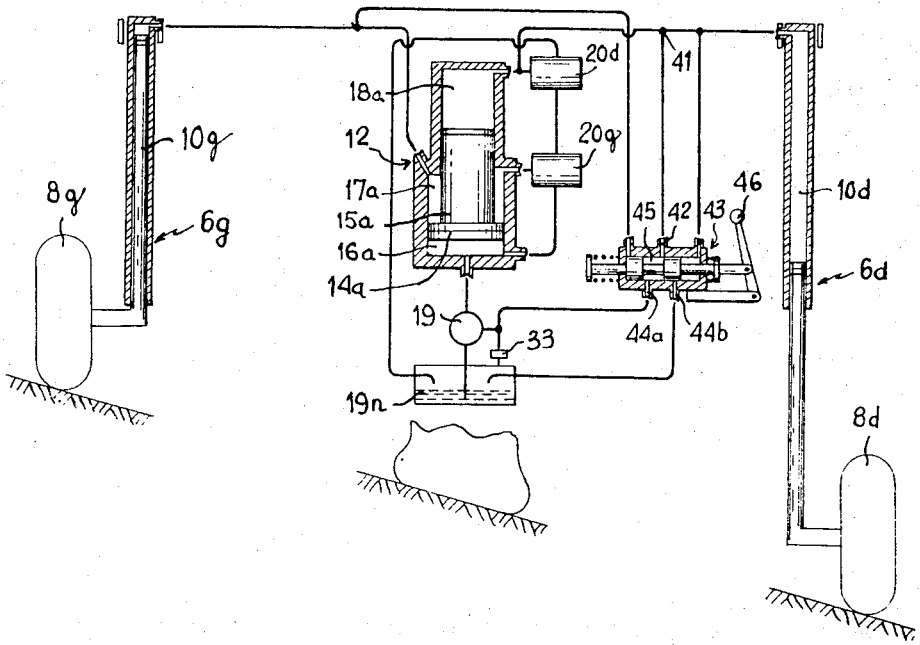

Thanks to such a device (FIG. 4), the capacity of jacks 17a and 18a with valves 20 allows extensions and shortenings of corresponding rods 6 which are appropriate for the maximum angle of righting of the vehicle, taking into account the transverse angle which elastic tires can assume without skidding (FIGS. 5 and 6). Besides, the connecting conduit, for example for cylinder 10d and jack 18a, presents a two-branch element 41 connected to middle port 42 of a distributor 43 which has two other ports 44a and 44b, respectively connected to a source of fluid under pressure and to a discharge circuit which is not pressurized, to which reference will be made later.

Distributor 43 presents a slide, with median groove 45 which can be controlled manually by a lever 46 or automatically controlled by the differences of pressure applied to the end faces of two pistons 47a, 47b which are separated by the groove 45 to ensure closing of ports 44a, 44b (FIG. 4) and communication of port 42 and port 44a (FIG. 6) or port 44b (FIG. 5). In this way the ends of distributor 43, being connected to cylinders 10, and the slide being subject to an antagonistic urging of two recall springs (not referenced), when there is a variation of ground slope (FIG. 5), wheel 8g tends to be overloaded as compared with wheel 8d, and the distributor slide 43 ensures communication of conduit 41 and exhaust 44b, which allows the following sequence of operations: at least partial emptying of cylinder 10d, to shorten rod 6d which is at the upper lever, closing valve 20d by a drop of pressure on said rod to supply jack 16a and consequently partly empty jack 18a via distributor 43 and discharge 44b driving the fluid of jack 17a into cylinder 10g to elongate rod 6g.

Obviously, the tractor is positioned substantially vertically without lifting its wheels 1, 2 because of shifts in opposite directions of wheels 8 with respect to the frame; these shifts are appropriate to the slope and contour of the terrain.

An identical result may be obtained by a slightly different process when wheel 8g is the lower one (FIG. 6). For this position, because of the reduction of the load on cylinder 10d, the slide establishes communication between port 44a of the pressurized fluid circuit and branch 41 to supply cylinder 10d and jack 18a, which has the effect of opening valve 20d.

In any case, the supply must be sufficient to tend to lift the tractor in such a way that the pressure in cylinder 10g, through it is less than that of cylinder 10d, will ensure communication 44a, 41 adequate for opening valve 20g and consequently effecting the transfer of fluid from cylinder 10g into jack 17a, retracting pistons 14a and 15a and effecting a flow of fluid from pump 19 and jack 16a via the unpressurized circuit back to tank 19n.

The two jacks 16a and 18a alternately play the role of supporting jack, and although valves 20 play a role identical with that described above, the asymmetry of operation of cylinders 10d, 10g is due to the fact that one of them, namely 10g, is connected to one of the auxiliary jacks (17a) to constitute a closed constant-volume system, whereas the other cylinder (10d) can be connected by the slide to the circuits of a system which allow either escape of the fluid or supply of pressurized fluid.

Such a supply could be ensured by a pump like pump 19, but to avoid utilization of second pump, pump 19 is supplied with a known means which permits division of its flow into two streams, one of which, connected to jack 16a, presents a constant output, the circuit of the other flow being connected to port 44a of distributor 43.

It is obvious that various changes and modifications may be made to the details of construction without thereby departing from the general spirit of the invention as set forth in the appended claims.

What is claimed is:

1. A vehicle having:
   a. a frame (3, 4, 5),
   b. wheels (1, 2) supporting the frame in an unstable manner in one direction (c, d) perpendicular to the general direction (a, b) of the points where said wheels (1, 2) touch the ground,
   c. a stabilizing device for the direction of instability (c, d) comprising:
      two elements for bearing on the ground (8d, 8g) placed on either side of the bearing line (a, b) of the wheels (1, 2) and spaced from the latter,
      means (6d, 10d; 6g, 10g) for connecting said bearing elements to the frame, comprising cylinders with pistons forming hydraulic chambers (10d, 10g) permitting displacements in height of said bearing elements,
      an assembly of two hydraulic chambers (17a, 18a) connected respectively to said hydraulic chambers of the connection means (10d, 10g) and a jack (16a) capable of ensuring a return of fluid from said hydraulic chambers (17a, 18a) towards the chambers of the bearing elements,
      a fluid circuit comprising a connection to said jack (16a) and means (20d, 20g) placed downstream of said connection in order to regulate the pressure in the upstream portion of the circuit, as a function of the variations of pressure of the hydraulic chambers (10d, 10g) of the connection means,
      fluid distribution means (43) connected to one of the chambers (18a), to the downstream part (19n) of said circuit and to a second circuit (44–19) equipped with supply means of a fluid under pressure.

2. A vehicle according to claim 1, wherein the means for supplying the second fluid circuit comprises a flow divider mounted on the fluid circuit, upstream of the connection to the jack (16a) of the device.

3. A vehicle according to claim 1, wherein the fluid distribution means comprises a cylinder having a slide-valve (45) provided to be controlled under the effect of a pressure difference in the chambers (10d, 10g) of the connection means of the bearing elements.

4. A vehicle according to claim 1, wherein the fluid distribution means comprises a cylinder having a slide-valve equipped with manual control means (46).

5. A vehicle according to claim 4, wherein the slide-valve cylinder of the distribution means comprises a connection to the jack (16a) of the stabilizing device.

6. A vehicle according to claim 4, wherein the slide-valve cylinder of the distribution means comprises another connection to the downstream part of the first fluid circuit.

* * * * *